Sept. 6, 1960 W. B. CRANE 2,951,615
HANDLE FOR BERRY BASKET AND THE LIKE
Filed Sept. 29, 1958

INVENTOR.
WALTON B. CRANE
BY Forrest J. Lilly
Attorney

United States Patent Office 2,951,615
Patented Sept. 6, 1960

2,951,615

HANDLE FOR BERRY BASKET AND THE LIKE

Walton B. Crane, South Pasadena, Calif., assignor to Allied Plastics Company, Los Angeles, Calif., a corporation of California Filed Sept. 29, 1958, Ser. No. 763,996

3 Claims. (Cl. 220—94)

This invention relates generally to handles for containers, and more particularly to a handle for small fruit baskets and the like.

Certain kinds of produce, such as grapes, for example, are often packaged for retail sale in small fruit baskets. Each basket is individually marked as to price in accordance with the weight of the basket contents. One fruit basket of this character consists of a molded plastic structure made up of thin, intersecting ribs defining rectangular openings therebetween.

A broad object of the present invention is the provision of a handle for a fruit basket of the character described.

A more specific object of the invention is the provision of a basket handle of the character described which affords a writing surface on which the price of the basket contents may be marked.

Another object of the invention is the provision of a basket handle of the character described which is made from thin sheet material, such as light-weight cardboard, for example.

Yet another object of the invention is the provision of a basket handle which may be rapidly attached to a fruit basket of the character described.

A further object of the invention is the provision of a basket handle of the character described which, when properly assembled on the basket, becomes firmly locked to the latter against accidental separation therefrom.

Yet a further object of the invention is the provision of a basket handle of the character described which is uniquely designed for simplicity and economy of fabrication.

The invention may be best understood from the following detailed description thereof taken in connection with the annexed drawings, wherein.

Figure 1:
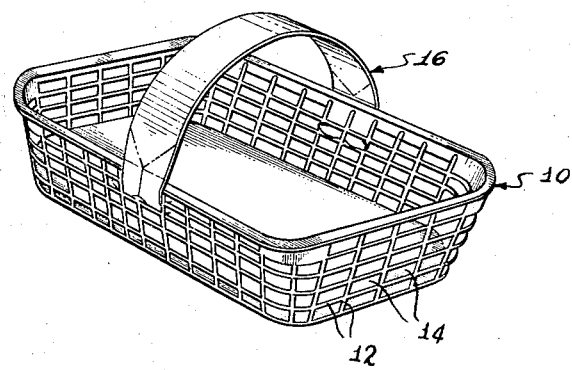
Fig. 1 is a perspective view of the present handle mounted on a produce basket of the type preliminarily mentioned.
Figure 2:
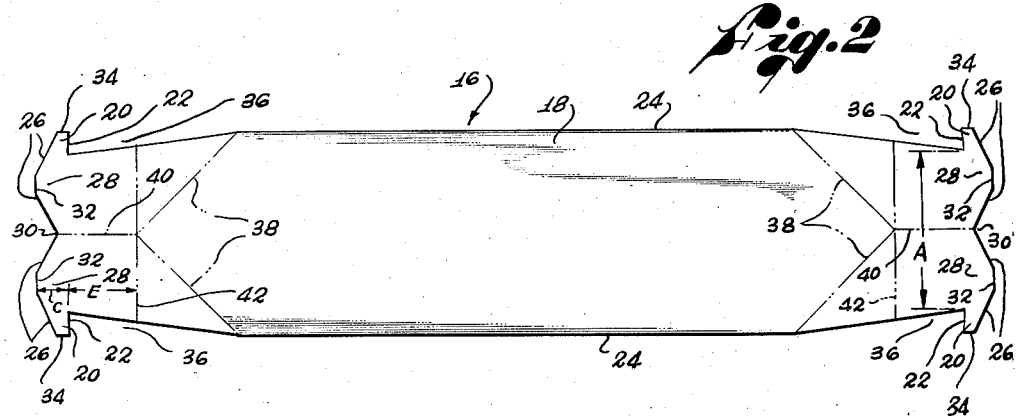
Fig. 2 is an enlarged view of the present handle when laid out flat.

In these drawings, the numeral 10 denotes a molded plastic fruit basket of the character preliminarily mentioned and for which the present handle is primarily designed. It will become clear as the description proceeds, however, that the handle may be used with other similar types of fruit baskets. Basket 10 comprises a plurality of intersecting ribs 12 defining rectangular openings 14 therebetween.

As will presently be more fully described, the handle 16 of this invention is adapted to be inserted through two pairs of openings, denoted by the numerals 14a, in the opposite side walls of the basket. The portions of the ribs 12 defining the edges of these openings have been designated by the numerals 12a, 12b and 12c.

Handle 16 of the invention comprises a relatively long, narrow strip 18 of thin, flexible, though somewhat stiff material, such as lightweight cardboard. The handle may be conveniently made by stamping it out of a long strip of material, as will be presently discussed.

Strip 18 is shaped to provide, at its opposite ends, pairs of transversely extending tabs or tongues 20. Tongues 20 extend beyond opposite side edges of the strip and have transverse, inwardly facing shoulder edges 22. The dimension A between the corners formed at the intersection of the shoulder edges 22 and side edges 24 of the strip 18 is approximately equal to the dimension B of the basket openings 14a.

Opposite ends of the strip 18 have pairs of longitudinally convergent end edges 26. These convergent edges define a pair of laterally spaced, longitudinally extending tabs or tongues 28 at each end of the strip. Each pair of tongues 28 is separated by a V-shaped recess 30 having its apex on the center line of the strip. The longitudinal dimension C between the shoulder edges 22 and the end edges 32 of the adjacent tongues 28 is slightly greater than the width D of the basket openings 14a.

The illustrative handle is so shaped that the side edges 24 of the strip 18 are colinear with the outer edges 34 of the tongues 20. This permits the handle 18 to be made from a long, narrow strip of material, for example, by notching the sides of the strip at 36, to form the shoulder edges 22, and cutting the strip into handles 16 along the convergent end edges 26. This unique design of the handle results in an appreciable saving of material.

Figure 3:
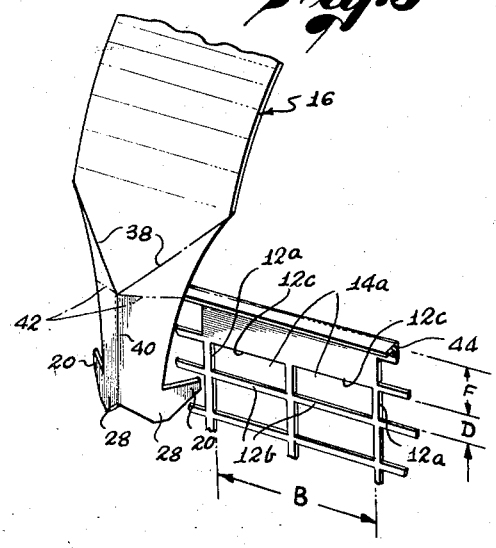
Fig. 3 is an enlarged detail in perspective of one of the present handles just prior to attachment to the basket.
Figure 4:
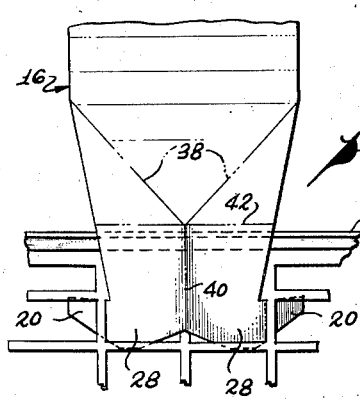
Fig. 4 is an enlarged detail in side elevation showing one end of the handle after attachment to the basket.

When attaching the handle to the basket, each end of the strip 18 is bent along the center line of the strip into a V-shaped configuration, as illustrated in Fig. 3. The tongues 20 are then inserted through the pairs of basket openings 14a, after which the ends are pressed flat against the basket so that the tongues engage behind the remote end edges 12a of the basket openings. Finally, the end tongues 28 are snapped in behind the lower edges 12b. This locking engagement of the end tongues behind the lower edges 12b effectively prevents bending of the ends of the strip about the strip center line so as to keep the tongues 20 from pulling out of the basket openings. When the attached handle 16 is lifted, the shoulder edges 22 move upwardly into engagement with the upper edges 12c of the basket openings to permit carrying of the basket by the handle.

In order to facilitate bending of the ends of the strip 18, in the manner just mentioned, during attachment of the handle to the basket, opposite ends of the strip are scored along outwardly convergent lines 38 which converge on the center line of the strip and join with longitudinal score lines 40 which extend to the ends of the strip. When an inward pressure is applied to opposite side edges of the strip at its ends, the strip folds along the score lines 38 and 40 into the V-configuration mentioned above. The strip is also provided with a pair of transverse score lines 42. These score lines are spaced a distance E from the shoulder edges 22 which is slightly greater than the spacing F between the upper edges 14c of the basket openings 14a and the upper edges 44 of the basket. When the basket is lifted by the handle, the strip 18 bends about the score lines 42. These latter score lines are provided to aid the natural bending of the strip about the upper edges of the basket which occurs when the latter is lifted by the handle.

If desired, the normally upper side of the handle may be imprinted with advertising, as shown. Also, the strip may have spaces in which the weight and price of the basket may be marked.

It will be apparent, therefore, that there has been described and illustrated a basket handle which is fully capable of attaining the objects and advantages preliminarily set forth. Various modifications in design and arrangement of parts of the invention are possible within the scope of the following claims.

I claim:

1. A basket handle comprising a strip of flexible material having a pair of laterally aligned tongues at each end which extend laterally from opposite side edges of the strip, each tongue having a shoulder edge facing the remote end of the strip, each end of the strip having a pair of convergent end edges at each side of the center line of the strip which converge toward the adjacent end of the strip to define a pair of longitudinally extending tongues and a V-notch at each end of the strip, each notch being located between the adjacent pair of longitudinally extending tongues and having its apex approximately on said center line, each end of the strip having one longitudinal fold line only which extends approximately along said center line from the apex of the adjacent V-notch toward the remote end of the strip and a pair of angular fold lines which intersect approximately on the adjacent longitudinal fold line and extend in divergent fashion toward the opposite side edges and the remote end of the strip.

2. A basket handle comprising a strip of flexible material having a pair of laterally aligned tongues at each end which extend laterally from opposite side edges of the strip, each tongue having a shoulder edge facing the remote end of the strip, each end of the strip having a pair of convergent end edges at each side of the center line of the strip which converge toward the adjacent end of the strip to define a pair of longitudinally extending tongues and a V-notch at each end of the strip, each notch being located between the adjacent pair of longitudinally extending tongues and having its apex approximately on said center line, each end of the strip having one longitudinal fold line only which extends approximately along said center line from the apex of the adjacent V-notch toward the remote end of the strip, a pair of angular fold lines which intersect approximately on the adjacent longitudinal fold line and extend in divergent fashion toward the opposite side edges and the remote end of the strip, and a transverse fold line approximately perpendicular to the longitudinal fold line.

3. In combination with a generally rectangular basket having an upper edge and opposite side walls each formed with two upper, closely adjacent rectangular openings spaced in a direction parallel to said upper edge to define a thin rib between each pair of openings, a handle comprising a strip of flexible material having a pair of tongues at each end extending laterally from opposite sides of the strip, each pair of tongues having approximately colinear shoulder edges extending laterally of and facing the remote end of the strip, the pairs of tongues being inserted through the pairs of openings from the outer side of the basket so that the laterally outer ends of each pair of tongues engage behind the remote, normally vertical side edges of the adjacent pair of openings, each end of said strip having a pair of convergent end edges at each side of the center line of the strip which converge toward the adjacent end of the strip to define a pair of longitudinally extending tongues at each end of the strip which engage behind the normally lower edges of the adjacent openings and a V-notch between each pair of longitudinally extending tongues, the apex of each V-notch being located over the adjacent rib between the upper and lower edges of the adjacent openings and said shoulder edges engaging the normally upper edges of said openings.

References Cited in the file of this patent

UNITED STATES PATENTS

| | | |
|---|---|---|
| 2,289,824 | Brogden | July 14, 1942 |
| 2,441,134 | Brogden | May 11, 1948 |
| 2,556,590 | Long | June 12, 1951 |